United States Patent

Hallenbeck

Patent Number: 5,100,043
Date of Patent: Mar. 31, 1992

[54] PURGE GAS UNIT WITH BLADDERS

[76] Inventor: Emerson J. Hallenbeck, 2934 Shoreland Ave., Toledo, Ohio 43611

[21] Appl. No.: 614,216

[22] Filed: Nov. 15, 1990

[51] Int. Cl.$^5$ ............................................. B23K 5/00
[52] U.S. Cl. ..................................... 228/42; 228/219
[58] Field of Search .................. 228/42, 49.3, 219; 219/69 R, 74, 59.1, 8.5; 29/282; 285/286

[56] References Cited

U.S. PATENT DOCUMENTS

| | | | |
|---|---|---|---|
| 3,095,844 | 7/1963 | Thielsch | 228/42 |
| 3,194,466 | 7/1965 | Davis | 228/42 |
| 3,292,254 | 12/1966 | Sloan | 228/42 |
| 3,338,499 | 8/1967 | Gilbert | 228/42 |
| 4,669,650 | 6/1987 | Moe | 228/42 |
| 4,828,160 | 5/1989 | Sundholm | 228/42 |
| 4,912,293 | 3/1990 | Mueller et al. | 219/74 |

Primary Examiner—Kurt Rowan
Assistant Examiner—Chuck Y. Mah
Attorney, Agent, or Firm—Allen D. Gutchess, Jr.

[57] ABSTRACT

A purge gas unit establishes an enclosed zone for purge gas within tubes or pipes having portions which are to be joined by welding. The purge gas unit includes a first bladder to be positioned on one side of the welding location and a second bladder positioned on the other side of the location. A purge gas supply tube extends through the first bladder and has an opening near the second bladder through which purge gas is supplied to the weld zone or space between the bladders. A vent tube extends through the first bladder and communicates with the weld zone near the first bladder and with a space beyond the first bladder. A safety cable also is attached to the second bladder and extends at least substantially through the first bladder, with the cable enabling the purge unit to be removed from the tubes after welding. The bladders can have annular chambers with central passages through which elongate members can extend. The bladders, in another embodiment, can be substantially flat when not inflated.

4 Claims, 3 Drawing Sheets

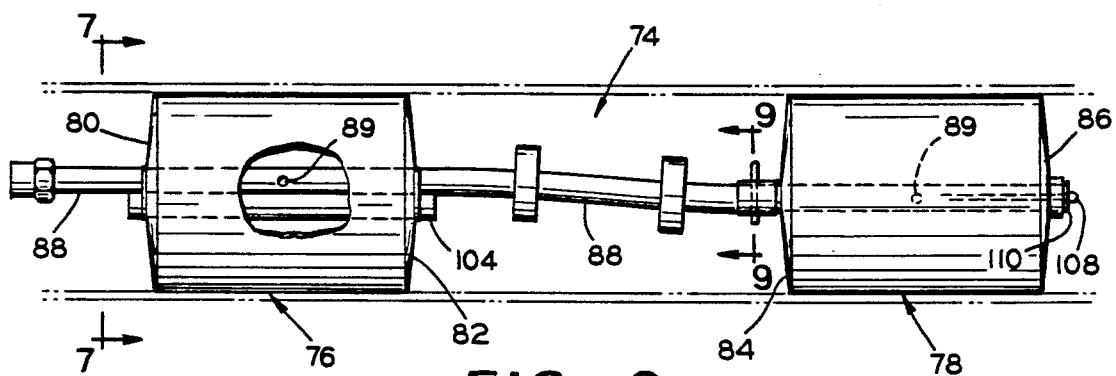
FIG. 6
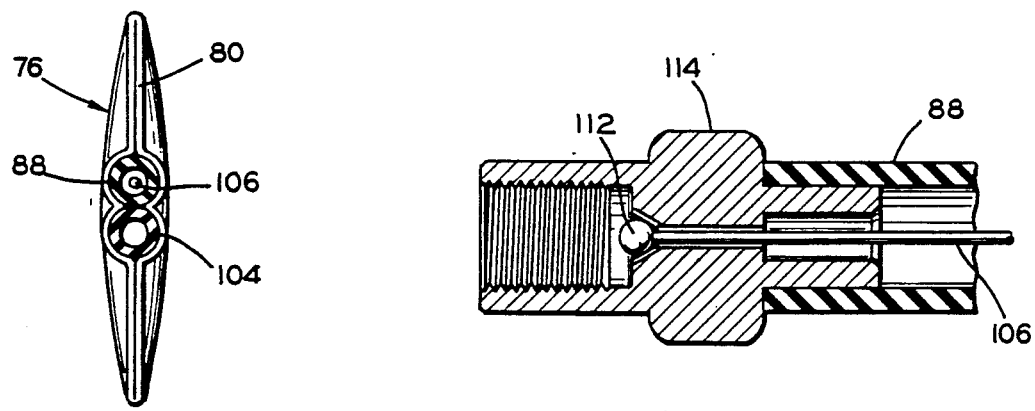
FIG. 7
FIG. 8
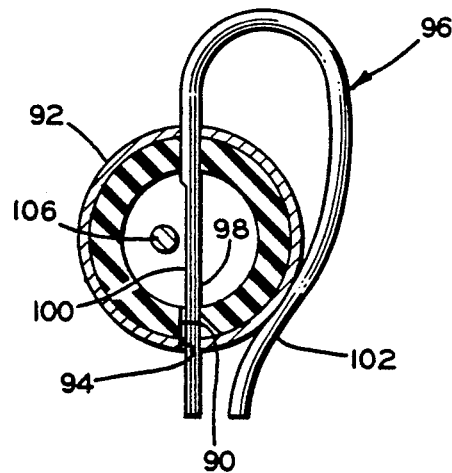
FIG. 9

PURGE GAS UNIT WITH BLADDERS

This invention relates to a gas purge unit for establishing an enclosed zone at a weld area to receive and contain purge gas.

It is important that, when welding many alloy metals, the weld area be out of contact with air or any other form of oxygen during the welding operation. In welding a pipe or tube of alloy, it is highly desirable not to purge the entire pipe or tube, or substantial lengths thereof, to maintain the weld area free of oxygen. Such requires a considerable amount of time in order to completely purge the weld area and also requires a substantial volume of the purge gas, which is expensive.

As shown in my U.S. Pat. No. 4,415,114, issued Nov. 15, 1983, cones have been employed in the tubular members, in the form of pipes or tubes, on each side of the weld area to form an enclosed zone which is substantially shorter than the entire lengths of the pipes or tubes. That purge unit included at least one first cone positioned on one side of the weld area and at least one second cone on the other side, with both cones being within the tubular members and forming substantially gastight seals therewith. A gas supply tube was connected to the apex of the second cone with purge gas supplied to the zone therebetween through an opening in the gas supply tube.

Inflatable bladders have also been used in place of the cones. The bladders are expanded by gas under pressure to seal against the inner surfaces of the tubular members and again form an enclosed zone. Such bladders have generally been of balloon shape and contained within fabric bags to limit the extent of expansion of the bladders and to keep them out of direct contact with the inner surfaces of the tubular members which can be at substantially elevated temperatures, particularly near the weld area.

The present invention provides a gas purge unit having a number of advantages over those heretofore known. The unit includes a purge gas supply tube extending through a first one of the bladders forming one end of the enclosed zone and having a supply opening near a second one of the bladders forming the other end of the enclosed zone through which the purge gas is supplied to the zone. A vent tube extends through the first bladder and has an inlet opening communicating with the enclosed zone near the first bladder and has an outlet opening beyond the first bladder away from the enclosed zone. With this arrangement, the purge gas is supplied to the enclosed zone near the second bladder and flows from there across the weld area and to the vent inlet near the first bladder. Thus, a flow of purge gas is established through and past the weld area to assure that area will be filled with purge gas. This flow of purge gas also is more effective for initially purging oxygen and/or any other contaminant gases from the enclosed zone.

The purge gas unit in accordance with the invention also has a safety cable which is attached to the second bladder and extends at least substantially through the first bladder. This enables the purge gas unit to be removed from the welded tubular members without the possibility of a portion or component of the unit being separated and left in the tubular members, the extraction of which could be extremely difficult, particularly for long tubular members. In a preferred form, the safety cable is encased in a non-metallic, preferably rubber, tubing so that the bare cable cannot contact inner surfaces of the tubular members. This is particularly important in a number of applications, such as beverage, brewing, and food processing operations which employ polished stainless steel tubular members, to eliminate possible scratching or marring of the polished surfaces.

In some instances, it is desired to place an elongate member in the form of a tube, line, etc. completely through the bladders and the enclosed welding zone to a space beyond the bladders. Such a line or tube can include a tube for venting, electrical lines, or fiber-optic lines, for example. In a preferred form of the invention, the bladders are of generally annular shape in cross section, being hollow in the middle for forming passages through which such tubes or lines can extend. These can be readily inserted before the bladders are inflated and, when the bladders are inflated, they form air-tight seals around the tubes or lines. Further, such tubes or lines do not require any special fittings or other attachments for securing them to the bladders or for providing passages therethrough.

In another form of the invention, the bladders can be substantially flat when not inflated but fill out to contact the inner surfaces of the tubular members when inflated. With the flattened, uninflated shape, the bladders can be more readily curled or folded and withdrawn through smaller openings when the weld is complete. Similarly, they can be inserted into the tubular members through smaller openings prior to welding.

In one embodiment of the invention, the purge gas supply tube opening can be fitted with a special orifice wire, the size and shape of which can determine the size of the orifice for controlling purge gas pressure and flow.

Preferably the gas employed to inflate the bladders is the same as the purge gas, which reduces the possibility of contamination. The purge gas supplied to the enclosed area can be supplied through a common tube which also supplies the gas to inflate the bladders, or can be supplied through a separate tube. In either event, a relief valve is employed to limit the pressure of the gas inflating the bladders to substantially eliminate the possible rupturing thereof due to overinflation.

It is, therefore, a principal object of the invention to provide a purge gas unit having two components, preferably in the form of bladders, forming an enclosed welding zone, with a gas supply tube emitting gas to the zone near one of the components and with a vent tube extending through the other component to vent purge gas from the opposite end of the zone.

Another object of the invention is to provide a purge gas unit employing bladders to form an enclosed zone with a safety cable extending between the bladders to facilitate safe withdrawal of the bladders after welding is completed.

A further object of the invention is to provide a purge gas unit employing bladders of annular shape having passages therethrough through which tubes or the like can be readily passed prior to the inflation of the bladders.

Yet a further object of the invention is to provide a purge gas unit with bladders having flattened shapes prior to inflation, to facilitate inserting and withdrawing the bladders through smaller openings.

Many other objects and advantages of the invention will be apparent from the following detailed description of preferred embodiments thereof, reference being made to the accompanying drawings, in which:

FIG. 6 is a somewhat schematic view in elevation of a modified purge unit in accordance with the invention, shown in an inflated condition;

FIG. 7 is a somewhat schematic end view of one bladder of FIG. 6 when not inflated; taken along the line 7—7 of FIG. 6;

FIG. 8 is an enlarged, detail view in longitudinal section of a fitting of the purge unit of FIG. 6; and FIG. 9 is an enlarged, detail view in transverse cross section taken along the line 9—9 of FIG. 6.

Figure 2:
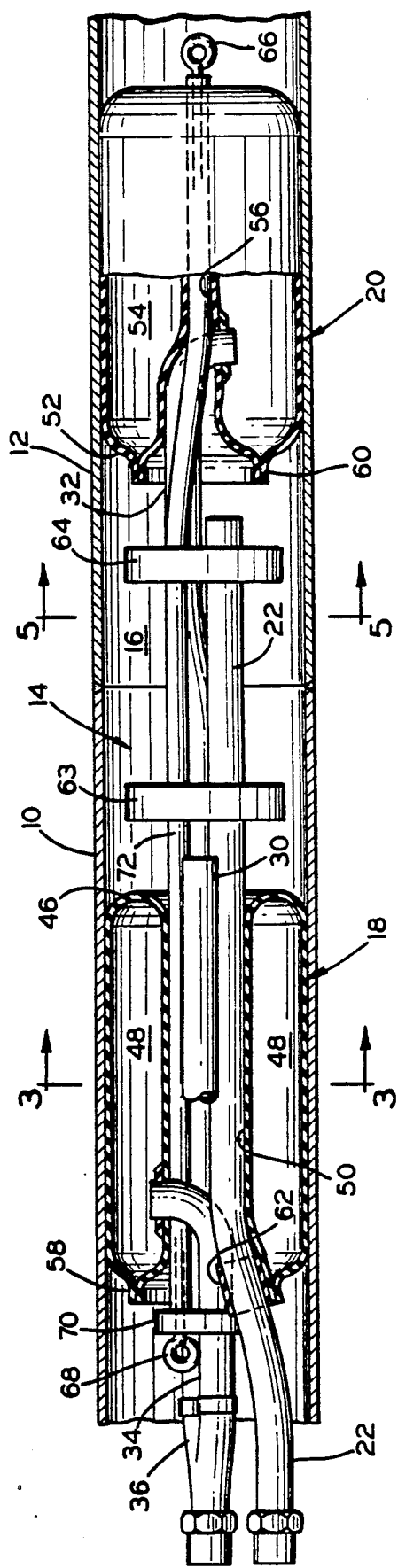
FIG. 2 is a somewhat schematic view, partly in elevation and partly in section, of the purge gas unit shown in FIG. 1, in an inflated condition and in position in tubular members.

Referring to the drawings, and particularly to FIG. 2, tubular members 10 and 12 are to be butt-welded at their ends at a predetermined location with the weld extending circumferentially around the ends, the members being in the form of pipes or tubes. The welding can be accomplished by conventional gas welding or other types, including the use of a plasma torch or a "TIG" process. In any case, when the tubular members 10 and 12 are made of many alloys, such as high nickel steel and stainless steel, the welding must be accomplished in an inert gas atmosphere. If the metal comes into contact with oxygen during the welding operation, oxidation and micro-cracks result in the weld area. By forming an enclosed zone within the tubular members, it is not necessary to purge the entire tubular members prior to welding. This is not only time consuming, but requires substantial quantities of the purge gas.

A purge gas unit 14 in accordance with the invention is employed to form an enclosed zone 16 which extends on both sides of the weld location. A first inflatable bladder 18 is located in the tubular member 10 and closes of the left end of the enclosed zone 16. A second inflatable bladder 20 is located in the tubular member 12 and closes off the right end of the zone 16.

Figure 1:
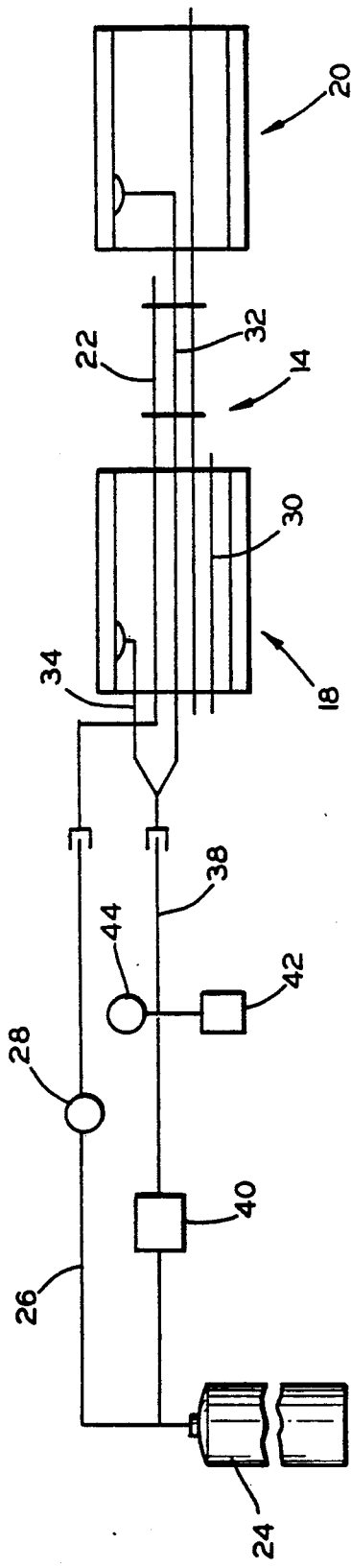
FIG. 1 is a diagrammatic view of a purge gas unit and controls in accordance with the invention.

In accordance with the invention, the purge gas supplied to the enclosed zone 16 is supplied at one end of the zone and vented from the other end so that a continuous flow of the gas is supplied across the weld area, which facilitates purging of the enclosed zone of oxygen and any other contaminant gases. Accordingly, purge gas is supplied through a flexible tube 22 to an end near the second bladder 20. In this instance, the purge gas is supplied from a suitable source or tank 24 (FIG. 1) through a line 26 and a flow meter 28. The purge gas is vented through the first bladder 18 by a vent tube 30 which has an inlet opening near the other end of the enclosed zone, near the bladder 18. This gas can be simply vented to the space beyond the bladder 18 which is always open since the gas is supplied through the tubes from that end.

Gas under pressure is used to inflate the bladders 18 and 20. This gas can be the same purge gas, which has the advantage of not contaminating the weld zone 16 is the bladder should leak or rupture. As shown, the bladder 20 receives the gas through a line 32 and the bladder 18 receives the gas through a line 34. As shown in FIG. 2, these can be connected by a "y" fitting 36 to a line 38. Gas from the tank 24 can be supplied through a combination regulator and flow meter 40, past a relief valve 42 and a gauge 44 to the "y" fitting and, hence, to the bladders 18 and 20. The relief valve 42 is important in limiting the pressure supplied to the bladders to substantially eliminate the possibility of rupturing.

The bladder 18 has a flexible wall 46 forming an annular chamber 48 with a hollow center, forming a passage 50 extending therethrough. Similarly, the bladder 20 has a wall 52 forming an annular chamber 54 with a hollow center, forming a passage 56 extending therethrough. In a preferred form, the bladder walls 46 and 52 are made of a high-temperature silicone rubber which can withstand the elevated temperatures encountered near the welding area. Each of the bladders 18 and 20 is preferably made by doubling back on itself a tube of the flexible material and then sealing the contiguous edges, indicated at 58 and 60 in FIG. 2. The sealing can be accomplished by a commercially-available solvent or adhesive.

Three sizes of the bladders 18 and 20 are all that are required to accommodate tubular members ranging from one inch to six inches in diameter. One size can cover one, one-and-one-half, and two inch diameter tubes; a second can accommodate two, three and four inch diameter tubes; and a third can accommodate three, four, and six inch diameter tubes.

Figure 4:
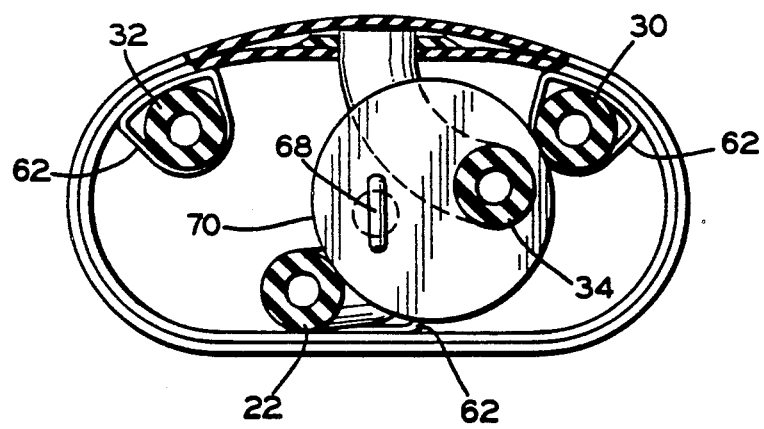
FIG. 4 is a schematic left end view, partly in section, of the purge gas unit of FIG. 2, when not inflated.

Each of the bladders can have three circumferentially-spaced loops 62 affixed to end portions thereof, as shown in FIGS. 2 and 4, to hold the purge gas lines and inflating gas lines or tubes, as well as the vent tube 30. The tubes extending through the enclosed zone 16 preferably pass through two stand-off discs 63 and 64 to prevent contact with the inner surfaces of the tubular members 10 and 12 near the weld area.

Figure 3:
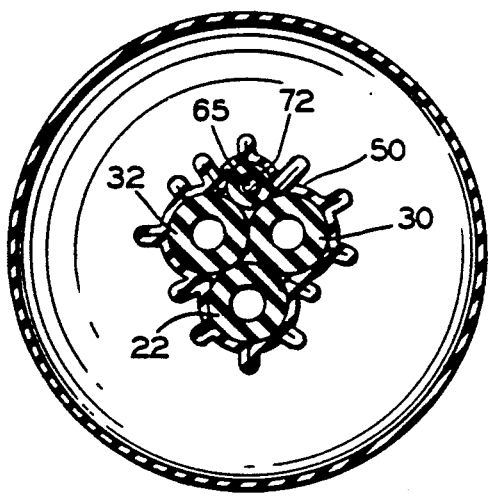
FIG. 3 is a somewhat schematic view in transverse cross section, taken along the line 3—3 of FIG. 2.
Figure 5:
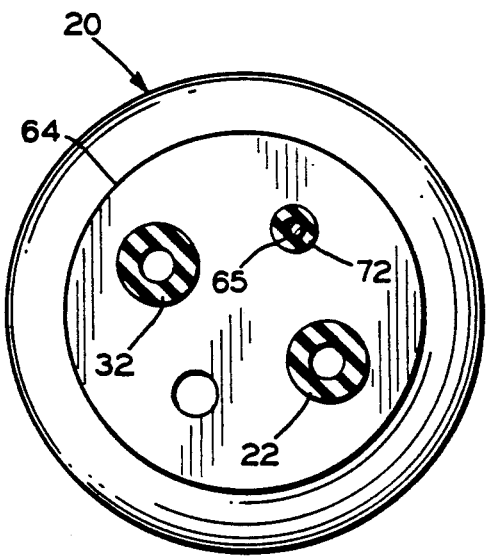
FIG. 5 is a view in transverse cross section taken along the line 5—5 of FIG. 2.

The bladders 18 and 20 in accordance with the invention, with their central passages 50 and 56, enable an additional elongate member in the form of a line or tube to be extended completely through the enclosed zone 16 and beyond the outer end of the second bladder 20 to the space therebeyond in the tubular member 12. Such a line or tube can be used to purge or vent space in the tubular member 12 beyond the bladder 20, for example. A fiber-optic line can also be employed to view the space beyond the bladder 20 or can be employed through the bladder 18 only to view the welding as it takes place. An electric line may also be used. Regardless of the type of line or tube, it is passed through the bladder or bladders prior to inflation thereof. When the bladders are inflated, the walls 46 and 52 expand outwardly against the inner surfaces of the tubular members 10 and 12 and also expand inwardly, as shown in FIG. 3, to provide a substantially gas-tight seal against the various elongate members, including the purge gas and inflating gas tubes and safety cable. A pressure of only three to five PSI is sufficient to adequately inflate the bladders 18 and 20 to cause them to fully seal against the tubular members and the tubes and lines extending therethrough. The additional line or tube can also extend through additional openings in the stand-off disc 63 and 64.

It is important that the entire purge unit 14 be removed from the welded tubular members 10 and 12 as a unit since any part thereof left remaining would be extremely difficult to remove, particularly for longer tubes. In accordance with the invention, a safety cable 65 extends through and connects the bladders 18 and 20.

The safety cable has an eye 66 at the right end which can be connected to one of the loops 62 of the bladder 20. The safety cable 65 can have a similiar eye 68 at the other end located beyond a disc 70 which anchors that end of the cable and prevents its passage through the bladder 18. An extraction line can then be affixed to the eye 68 to assure that the safety cable 65 will withdraw all components of the purge unit 14 therewith when welding is completed. In a preferred form, the safety cable 65 extends through a silicone rubber tube or sheath 72 to prevent the possibility of the cable marring the inner surfaces of the tubular members 10 and 12.

It may be noted from the above, that the only metal parts exposed with the tubular members 10 and 12 are the eyes 66 and 68 which are well spaced from the inner surfaces of the members 10 and 12. All of the other components are of silicone rubber so that scratching or marrying of the inner surfaces of the tubular members 10 and 12, which may be highly polished for certain food operations and the like, will not occur.

A modified purge gas unit according to the invention is shown in FIGS. 6–9 and is indicated at 74. The purge unit 74 includes two inflatable bladders 76 and 78. The bladders can be made of silicone rubber tubes with ends 80, 82 and 84, 86 cut diagonally to be of generally triangular configuration and sealed by the aforementioned solvent or adhesive. The central portions of the bladders assume a generally circular configuration in section to seal the rubber members when supplied with gas under pressure. However, when the bladders are not inflated, they automatically collapse and assume a generally flat shape (FIG. 7) which enables them to be curled and withdrawn from smaller openings in a pipe or tube than is otherwise possible. In the flat state, they also contain minimal air which is purged through the welding zone with this embodiment.

A single tube 88 extends through both of the bladders 76 and 78 and is sealed at the end portions thereof. The tube 88 serves several purposes. It is connected to a source of inert gas such as the tank 24 and is equipped with a regulator and flow meter as well as a relief valve similar to the elements 40 and 42 of FIG. 1. In this instance, the inert gas is supplied through suitable openings 89 in the tube 88 within the bladders 76 and 78 in order to inflate the bladders with the inert gas. In addition, the tube 88 has an opening 90 (FIG. 9) near one end of the enclosed welding zone, adjacent the bladder 78. A metal collar 92 surrounds this portion of the tube 88 and has an orifice 94 communicating with the opening 90. A clip pin 96 also extends through the metal collar 92 and has a sizing pin end 98 with a flat side 100 extending through the opening 90 and the orifice 94. The clip pin 96 further has a loop portion 102 which bears against the metal collar 92 to hold the sizing end 98 of the clip pin 96 in position. The size of the flat side 100 of the pin determines the effective area of the collar orifice 94 to control the volume of purge gas flowing through the orifice 94 and into the enclosed zone.

A vent tube 104 extends through the bladder 76 in contiguous relationship with the tube 88 and is sealed at the ends 80 and 82. The vent tube 104 has an opening in the enclosed zone near the bladder 76 and an exit opening beyond the bladder 76. Thus, as with the purge unit 14, the purge gas is supplied near one end of the enclosed zone, flows across the welding area, and out of the enclosed zone near the other end thereof.

The tube 88 serves a further function in that it houses a safety cable 106. The cable 106 has an enlarged end 108 received in a metal washer 110 in the end 86 of the bladder 78. At the other end, the cable 106 has a swaged enlargement 112 which extends through a metal fitting 114 to hold the cable therein. The safety cable 106 serves the same purpose as the cable 65.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A purge gas unit for use with tubular members, portions of which are to be joined by welding, said purge gas unit comprising a first inflatable bladder to be positioned on one side of the portions to be welded and located within one of the tubular members, said bladder having wall means forming an annular chamber with a hollow center forming a passage therethrough, a second inflatable bladder to be positioned on the other side of the portions to be welded and located within the other tubular member, said second bladder having wall means forming a second annular chamber with a hollow center forming a second passage extending therethrough, a first gas supply tube for supplying gas to said first bladder to inflate same, and a second gas supply tube for supplying gas to said second bladder to inflate same, said bladders having circumferentially-spaced loops at ends thereof for receiving gas supply tubes and the like.

2. A purge gas unit for use with tubular members, portions of which are to be joined by welding, said purge gas unit comprising a first inflatable bladder to be positioned on one side of the portions to be welded and located within one of the tubular members, said bladder having wall means forming an annular chamber with a hollow center forming a passage therethrough, a second inflatable bladder to be positioned on the other side of the portions to be welded and located within the other tubular member, said second bladder having wall means forming a second annular chamber with a hollow center forming a second passage extending therethrough, a first gas supply tube for supplying gas to said first bladder to inflate same, a second gas supply tube for supplying gas to said second bladder to inflate same, a third gas supply tube extending through said first bladder and having an opening to emit purge gas into the space between said bladders near said second bladder, and a vent tube extending through said first bladder to vent purge gas from the space between said bladders near said first bladder to a space beyond said first bladder.

3. A purge gas unit for use with tubular members, portions of which are to be joined by welding, said purge gas unit comprising a first inflatable bladder to be positioned on one side of the portions to be welded and located within one of the tubular members, said bladder having wall means forming an annular chamber with a hollow center forming a passage therethrough, a second inflatable bladder to be positioned on the other side of the portions to be welded and located within the other tubular member, said second bladder having wall means forming a second annular chamber with a hollow center forming a second passage extending therethrough, a first gas supply tube for supplying gas to said first bladder to inflate same, a second gas supply tube for supplying gas to said second bladder to inflate same, and a safety cable attached to said second bladder and extending at least substantially through said first bladder, said cable being encased in a non-metallic sheet.

4. A purge gas unit for use with tubular members, portions of which are to be joined by welding, said purge gas unit comprising a first inflatable bladder to be positioned on one side of the portions to be welded and within one of the tubular members, said first bladder having a tubular portiuon with sealed ends whereby said bladder extends to a circular configuration in transverse cross section when inflated and is substantially flat when not inflated, a second inflatable bladder to be positioned on the other side of the portions to be welded and within the other tubular member, said second bladder having a tubular portion with sealed ends whereby said bladder extends to a circular configuration in transverse cross section when inflated and is substantially flat when not inflated, a gas supply tube extending through said first bladder and having an opening for supplying gas to the interior of said first bladder, said gas supply tube extending at least into said second bladder and having an opening for supplying gas to the interior of said second bladder, said gas supply tube having a fitting located beyond said first bladder away from the space between said bladders, and a cable held by said fitting, extending through said gas supply tube, and anchored to the end of said second bladder away from the space between said bladders.

* * * * *

UNITED STATES PATENT AND TRADEMARK OFFICE
CERTIFICATE OF CORRECTION

PATENT NO. : 5,100,043
DATED : March 31, 1992
INVENTOR(S) : Emerson J. Hallenbeck It is certified that error appears in the above-identified patent and that said Letters Patent is hereby corrected as shown below:

Column 4, line 61, change "disc" to --discs--.

Column 5, line 29, change "rubber" to --tubular--.

Column 7, line 6, claim 4, line 6, change "portiuon" to

--portion--.

Signed and Sealed this

Twenty-first Day of September, 1993

Attest:

BRUCE LEHMAN

*Attesting Officer*   *Commissioner of Patents and Trademarks*